(12) United States Patent
Adams et al.

(10) Patent No.: US 8,348,633 B2
(45) Date of Patent: Jan. 8, 2013

(54) SPEED-DEPENDENT STABILITY VALVE

(75) Inventors: Joshua Adams, New Hartford, CT (US);
Michael F. Cass, Rockford, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 470 days.

(21) Appl. No.: 12/635,936

(22) Filed: Dec. 11, 2009

(65) Prior Publication Data

US 2011/0142691 A1  Jun. 16, 2011

(51) Int. Cl.
*F04D 7/02* (2006.01)
(52) U.S. Cl. ............... 417/294; 417/293; 60/468
(58) Field of Classification Search .......... 417/293, 417/294; 50/468; 60/468
See application file for complete search history.

(56) References Cited

U.S. PATENT DOCUMENTS

| 3,805,754 | A |   | 4/1974  | Soltau |
|---|---|---|---|---|
| 4,027,474 | A |   | 6/1977  | Demase |
| 4,362,474 | A | * | 12/1982 | Andrews ............ 417/80 |
| 4,607,486 | A |   | 8/1986  | Cole |
| 4,818,177 | A |   | 4/1989  | Grohmann |
| 4,850,796 | A |   | 7/1989  | Miller |
| 5,220,793 | A |   | 6/1993  | McGlone et al. |
| 5,742,507 | A |   | 4/1998  | Eckert |
| 5,941,206 | A |   | 8/1999  | Smith et al. |
| 6,059,537 | A |   | 5/2000  | Cygnor |
| 6,092,546 | A |   | 7/2000  | Lebrun et al. |
| 6,353,790 | B1 |  | 3/2002  | Tsuzuki |
| 7,216,487 | B2 |  | 5/2007  | Parsons |
| 2001/0025482 | A1 | * | 10/2001 | Futa et al. ............ 60/39.281 |

FOREIGN PATENT DOCUMENTS

| GB | 983141   | 2/1965  |
|---|---|---|
| GB | 1507907  | 12/1975 |
| JP | 58057571 | 4/1983  |

OTHER PUBLICATIONS

UK Combined Search and Examination Report dated Apr. 6, 2011.

* cited by examiner

*Primary Examiner* — Charles Freay
*Assistant Examiner* — Patrick Hamo
(74) *Attorney, Agent, or Firm* — Carlson, Gaskey & Olds PC

(57) ABSTRACT

A stability valve assembly includes a centrifugal pump and a valve downstream of the centrifugal pump. The valve includes a valve member that is movable along a valve axis within a valve body to control a fluid flow from the centrifugal pump. The valve member has a first orifice connecting a valve input to a valve chamber, and has at least one second orifice connecting a valve outlet to the valve chamber. A reference pressure upstream of the centrifugal pump applies pressure to a stepped portion of the valve member such that an amount of negative feedback provided by the valve assembly is proportional to a rotational speed of the centrifugal pump.

12 Claims, 3 Drawing Sheets

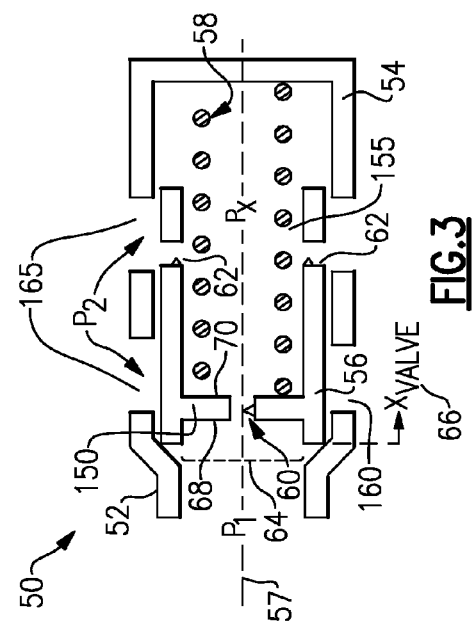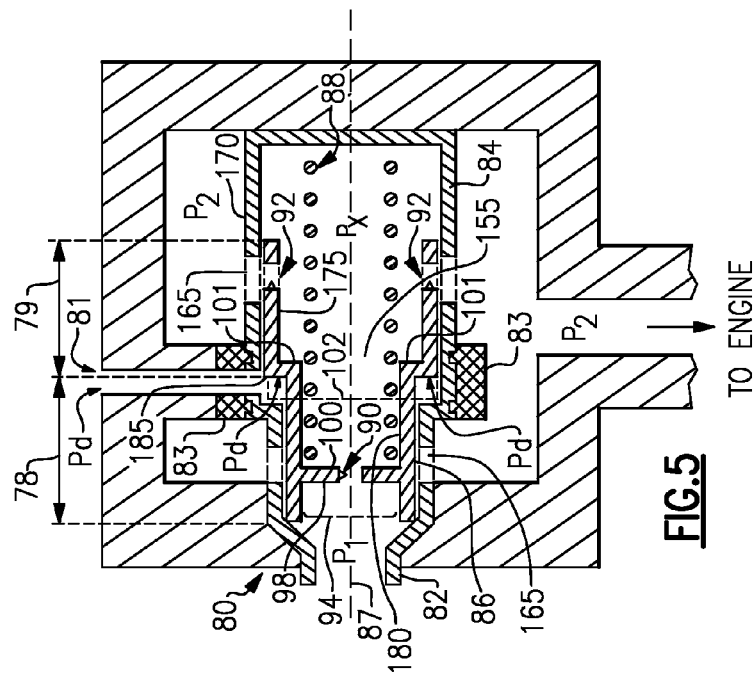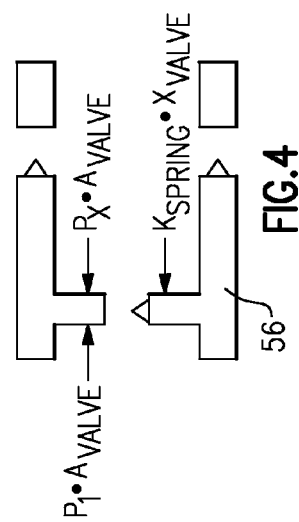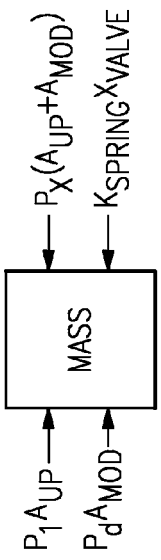

SPEED-DEPENDENT STABILITY VALVE

BACKGROUND OF THE INVENTION

This application relates to a stability valve used in combination with a fluid pump.

Centrifugal pumps are used to move fluids through piping systems. Stability valves have been used to control centrifugal pump output. Prior art stability valves have been designed to be flow-dependent, such that the valves exhibit an increasing pressure drop as valve flow increases.

SUMMARY OF THE INVENTION

A stability valve assembly includes a centrifugal pump and a valve downstream of the centrifugal pump. The valve includes a valve member that is movable along a valve axis within a valve body to control a fluid flow from the centrifugal pump. The valve member has a orifice connecting a valve input to a valve chamber, and has at least one second orifice connecting a valve outlet to the valve chamber. A reference pressure upstream of the centrifugal pump applies pressure to a stepped portion of the valve member such that an amount of negative feedback provided by the valve assembly is proportional to a rotational speed of the centrifugal pump.

These and other features of the present invention can be best understood from the following specification and drawings, the following of which is a brief description.

BRIEF DESCRIPTION OF THE DRAWINGS

FIG. 3 schematically illustrates a second stability valve.

FIG. 4 schematically illustrates forces being applied to a poppet in the valve of FIG. 4.

FIG. 5 schematically illustrates a third stability valve.

FIG. 6 schematically illustrates forces being applied to the poppet of FIG. 5.

DETAILED DESCRIPTION

Figure 1:
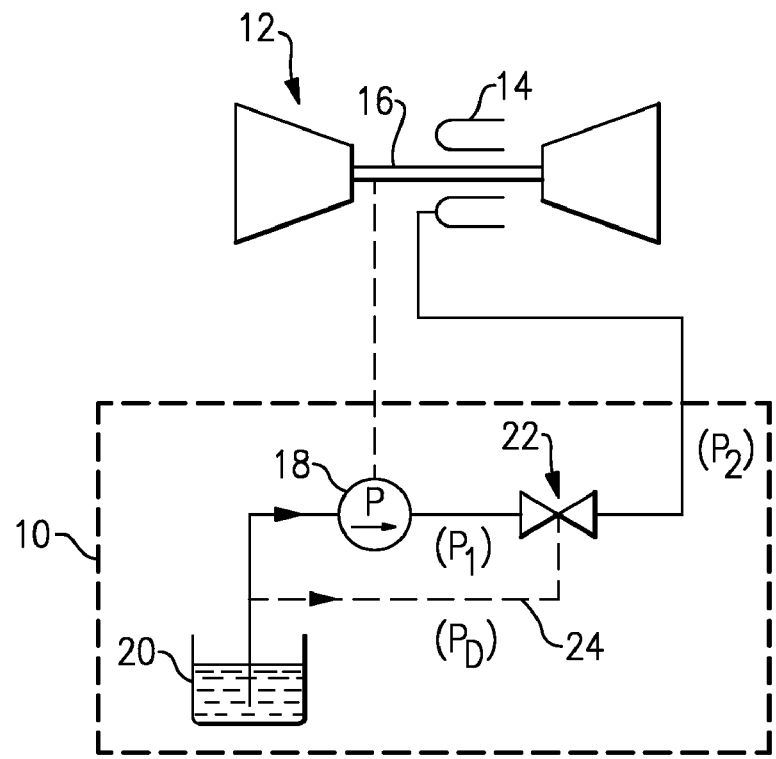
FIG. 1 schematically illustrates a centrifugal pump fuel system.

FIG. 1 schematically illustrates a centrifugal pump fuel system 10. In this case, the system 10 is operatively connected with a gas turbine engine 12, which includes combustors 14. The system 10 may deliver fuel to the gas turbine engine 12. A turbine shaft 16 of the gas turbine engine 12 drives a centrifugal fuel pump 18 of the system. The pump 18 takes suction from fuel tank 20, and delivers fuel through stability valve 22 (see FIG. 6) to the combustors 14.

Centrifugal 18 pump instability can occur when a change in pump discharge pressure with a change in pump flow (dp/dQ) is positive, setting up a dynamic system with a positive feedback, which is unstable. The stability valve 22 uses a pressure drop across the valve 22 to provide a negative feedback, cancelling the positive feedback from the pump 18 and stabilizing the fuel system 10. Prior art stability valves (see FIG. 2) have been designed to be flow-dependent, such that the valves exhibit an increasing pressure drop as valve flow increases. The valve 22, however, is speed-dependent such an amount of negative feedback provided by the valve 22 depends on an operating speed of the pump 18 and such that unnecessary amounts of negative feedback are not provided at low pump speeds. An amount of negative feedback (Feedback$_{negative}$) provided by the valve 22 may be determined by equation #1 below.

$$Feedback_{negative} = \frac{2(P_1 - P_2)}{Q_{valve}} \quad \text{equation \#1}$$

where $P_1$ is a valve inlet pressure;
$P_2$ is a valve outlet pressure; and
$Q_{valve}$ is an amount of fluid flow through the valve 30.

The operation of the centrifugal fuel pump 18 is governed by equations #2 and #3 below, which demonstrate that the centrifugal pump outlet pressure ($P_{act}$) at a given normalized flow is proportional to the square of the ratio of actual pump speed ($N_{act}$) to a reference pump speed ($N_{ref}$).

$$P_{act}(Q_{ref}) = P_{ref}(Q_{ref}) * \left(\frac{N_{act}}{N_{ref}}\right)^2 \quad \text{equation \#2}$$

where $P_{act}$ is an actual centrifugal pump output pressure;
$Q_{ref}$ is an actual flow through the centrifugal pump;
$P_{ref}$ is a reference centrifugal pump output pressure;
$N_{act}$ is an actual centrifugal pump speed; and
$N_{ref}$ is a reference centrifugal pump speed. For example, $N_{ref}$ may be a maximum rated pump speed as defined by a manufacturer of the pump. Of course, other non-maximum pump speeds could be used.

$$\left(\frac{\delta P}{\delta Q}\right)_{act}(Q_{ref}) = \left(\frac{\delta P}{\delta Q}\right)_{ref}(Q_{ref}) * \left(\frac{N_{act}}{N_{ref}}\right)^2 \quad \text{equation \#3}$$

Figure 2:
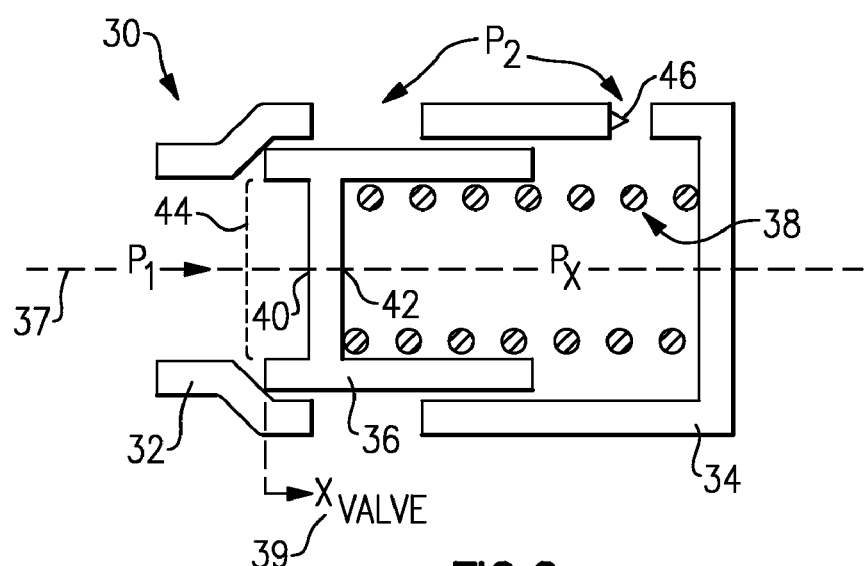
FIG. 2 schematically illustrates a first, prior art stability valve.

FIG. 2 schematically illustrates a first, prior art stability valve 30 that includes a valve seat 32, a valve body 34, a poppet 36 movable along a valve axis 37, and a spring 38. As the valve opens to allow more flow, the spring 38 is compressed and a spring force ($K_{spring} \cdot X_{valve}$) is increased. A pressure $P_1$ is applied to a first side 40 of the poppet 36. Pressure $P_X$ is applied to a second side 42 of the poppet 36. The valve body 34 includes a pressure-dropping orifice 46. $P_2$ is a valve outlet pressure (i.e. pressure downstream of the stability valve 30). $P_X$ and $P_2$ are related through the pressure-dropping orifice 46. During steady state operation, $P_X$ would be equal to $P_2$. The valve 30 is "flow-dependent" in that its negative feedback depends on an amount of fluid flow through the valve 30, as determined by the stroke of the poppet 36. This results in unnecessary negative feedback when the pump 18 operates at low speeds.

FIG. 3 schematically illustrates a second stability valve 50. The valve 50 includes a valve seat 52, a valve body 54, a poppet 56 movable along a valve axis 57, and a bias member 58 (e.g. a spring). The valve body has a wall 170 that has an outlet 160 and an opening(s) 165. The poppet has an area 175 of increased diameter and an area 180 of decreased diameter that define a shoulder 185 therebetween. The poppet defines an inner chamber 155. The poppet 56 includes a first pressure-dropping orifice 60 (or outlet) and at least one second pressure-dropping orifice 62 (or outlet). Equation #4, shown below, may be used to describe behavior of the valve 50.

$$0 = (P_1 - P_X)A_{valve} - K_{spring} \cdot X_{valve} \quad \text{equation\#4}$$

where $P_1$ is a centrifugal pump output pressure;
$P_X$ is a pressure inside the valve body 54;
$A_{valve}$ is an area of region 64 of the poppet 56;
$K_{spring}$ is a spring constant of the a valve spring 58; and
$X_{valve}$ is a stroke 66 of the poppet 56.

As shown in FIG. 3, pressure $P_1$ is applied to a first side 68 of the poppet 56. Pressure $P_X$ is applied to a second side 70 of the poppet 56. The first side 68 and the second side 70 form a plate 150. $P_2$ is a pressure downstream of the stability valve 50. In the example of the valve 50, $P_X$ depends on both $P_1$ and $P_2$, as shown in equation #5 below.

$$P_X = P_2 + \frac{F_{n1-x}^2}{F_{n1-x}^2 + F_{n2-x}^2}(P_1 - P_2) \qquad \text{equation \#5}$$

where $F_{n1-x}$ is a flow through orifice 60 (or inlet) at 1 pounds per square inch differential ("psid") differential pressure; and $F_{n2-x}$ is a flow through orifice 62 at 1 psid differential pressure.

FIG. 4 is a free body diagram that schematically illustrates forces being applied to the poppet 56. On the first side 68 of the poppet 56, a force of $P_1 \cdot A_{valve}$ is applied, and on the second side 70 of the valve 40, a pressure $P_X$ force ($P_k \cdot A_{valve}$) and a spring force ($K_{spring} \cdot X_{valve}$) are applied. An amount of negative feedback provided by the valve 50 (see equation #1) would provide less inefficiency than the prior art valve 30 of FIG. 2. However there is still room for improvement, as demonstrated by the embodiment of FIG. 6.

Figure 5A:
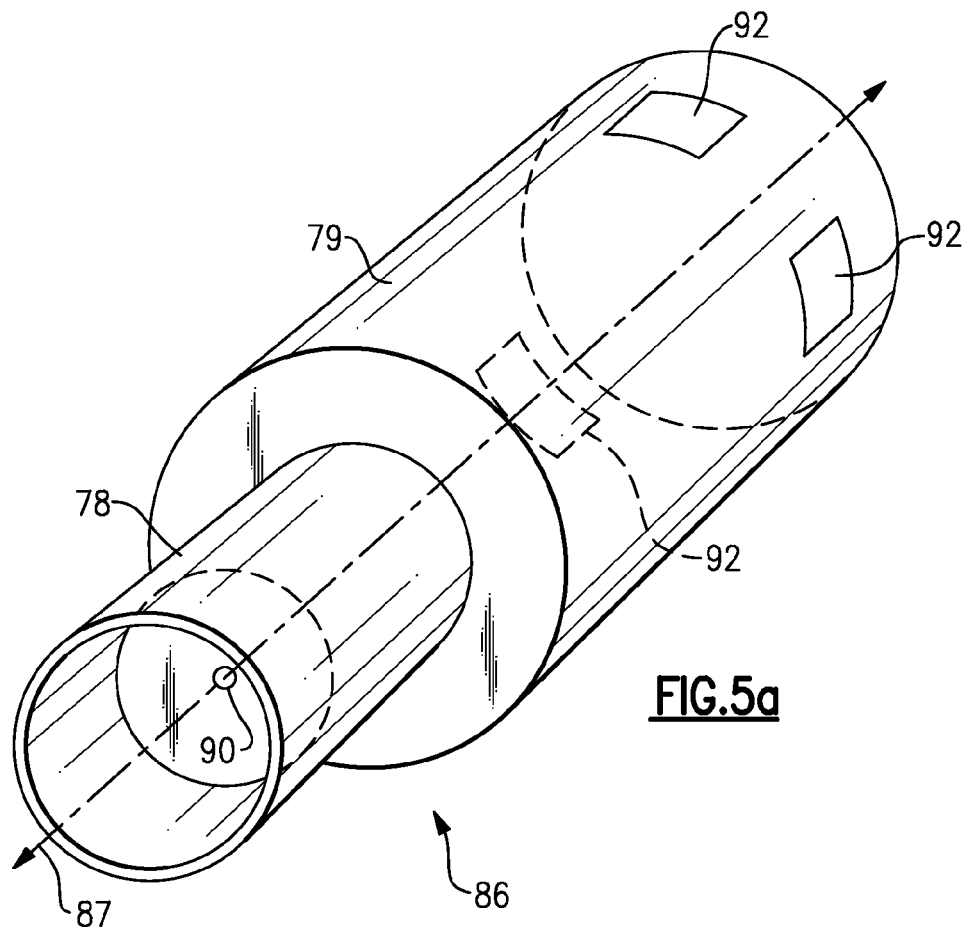
FIG. 5a schematically illustrates pressure-dropping orifices of a poppet in the valve of FIG. 5.
Figure 5B:
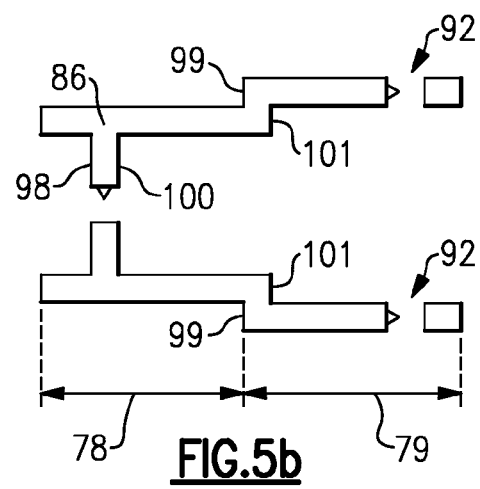
FIG. 5b is a sectional view of the poppet of FIG. 5.

FIG. 5 schematically illustrates a third stability valve 80 that may be used as the valve 22. The valve 80 includes a valve seat 82, a valve body 84, a poppet 86 movable along a valve axis 87, and a bias member 88 (e.g. a spring). The poppet 86 includes a first, non-stepped portion 78 and a second, stepped portion 79 (see FIGS. 5a-b). The poppet 86 includes a first pressure-dropping orifice 90 and at least one second pressure-dropping orifice 92. For example, the valve 80 may include a plurality of pressure-dropping orifices 92 spread along a circumference of the poppet 86 (see FIG. 5a). Equation #6, shown below, may be used to describe behavior of the valve 50.

$$0 = (P_1 - P_X)A_{valve} - K_{spring} \cdot X_{valve} \qquad \text{equation \#6}$$

where $P_1$ is a centrifugal pump output pressure;

$P_X$ is a pressure inside the valve body 84;

$A_{valve}$ is an area of region 94 of the poppet 86;

$K_{spring}$ is a spring constant of the a valve spring 88; and $X_{valve}$ is a stroke 96 of the poppet 86.

FIG. 6 is a free body diagram that schematically illustrates forces being applied to the poppet 86. As shown in FIG. 6, pressure $P_1$ is applied to a first side 98 of the non-stepped portion 78 of the poppet 86. A reference pressure $P_d$, which is a pressure upstream of the centrifugal pump 18, is applied to a first side 99 of the stepped portion 79 via line 24 (see FIG. 1). In one example, the reference pressure $P_d$ enters the valve 80 through a passage 81 that passes through an O-ring 83. Pressure $P_X$ is applied to a second side 100 of the non-stepped portion 78 and is applied to a second side 101 of the stepped portion 79 of the poppet 86. $P_2$ is a pressure downstream of the stability valve 50. In the example of the valve 80, $P_X$ depends on both $P_1$ and $P_2$, as shown in equation #7 below, and also on the reference pressure $P_d$.

$$0 = P_1 A_{up} + P_d A_{mod} - P_X A_{up} - P_X A_{mod} - K_{spring} X_{valve} \qquad \text{equation \#7}$$

$$0 = (P_1 - P_X)A_{up} - (P_X - P_d)A_{mod} - K_{spring} X_{valve} \qquad \text{equation \#8}$$

where $A_{up}$ is an area of region 94 (i.e. the area of first side 98 of the non-stepped portion 78); and $A_{mod}$ is an area of region 102 of the poppet 86 minus the area of region 94 of the poppet 86 (i.e. the area of first side 99 of stepped portion 79).

$P_X$ may be determined using equation #9 below.

$$P_X = P_2 + \frac{F_{n1-x}^2}{F_{n1-x}^2 + F_{n2-x}^2}(P_1 - P_2) \qquad \text{equation \#9}$$

where $F_{n1-x}$ is a flow through orifice 90 at 1 psid differential pressure; and $F_{n2-x}$ is a flow through orifice 92 at 1 psid differential pressure.

By substituting the value of $P_1$ shown in equation #10, one reaches the formula shown in equation #11.

$$P_1 = \left(\frac{N_{act}}{N_{rated}}\right)^2 P_{rated} \qquad \text{equation \#10}$$

where $N_{act}$ is an actual centrifugal pump speed; and $N_{ref}$ is a reference centrifugal pump speed.

$$(P_1 - P_2) = \qquad \text{equation \#11}$$

$$\frac{1}{(A_{up} + A_{mod})\left(\frac{F_{n2-x}^2}{F_{n1-x}^2 + F_{n2-x}^2}\right)}\left[\left(\frac{N_{act}}{N_{ref}}\right)^2 A_{mod} + K_{spring} X_{valve}\right]$$

As shown in equations #10 and #11, the value of $P_1$ is explicitly dependent on an operating speed of the centrifugal pump 18. Referring to equation #1. $P_1$ is a term used to determine negative feedback (Feedback$_{negative}$). Thus, unlike the prior art, where an amount of negative feedback has been "flow dependent," the amount of negative feedback provided by the valve 80 is instead "speed dependent" in that it depends on a speed of the centrifugal pump 18.

Negative feedback can be considered to be wasted energy in the system 10, so it is desirable to have as little as negative feedback possible. The valve 80 achieves this by only providing negative feedback when it is needed. At low speeds of the pump 18, the valve 80 provides almost no negative feedback, and by providing increased negative feedback at greater rotational speeds of the pump 18. Thus, the valve 80 optimizes the operating conditions at which large pressure drops are realized by the stability valve 80 around those operating conditions at which the pump 18 requires the pressure drops for stability, but minimizes the pressure drop when it is not required for stability in the system 10.

Although $F_{n1-x}$ and $F_{n2-x}$ have been described as corresponding to 1 psid differential pressure, it is understood that these variables apply at other differential pressures as long as they corresponded to the same differential pressure. For example, $F_{n1-x}$ and $F_{n2n-x}$ could correspond to 2 psid or 3 psid instead of 1 psid.

Although embodiments have been disclosed, a worker of ordinary skill in this art would recognize that certain modifications would come within the scope of this invention. For that reason, the following claims should be studied to determine the true scope and content of this invention.

What is claimed is:

1. A stability valve assembly, comprising:
   a centrifugal pump; and
   a valve downstream of the centrifugal pump and having a valve member that is movable along a valve axis within a valve body to control a fluid flow from the centrifugal pump, the valve member having a first orifice connecting a valve inlet to a valve chamber, having at least one second orifice connecting a valve outlet to the valve chamber, a reference pressure upstream of the centrifugal pump applying pressure to a stepped portion of the valve member such that an amount of negative feedback provided by the valve assembly is proportional to a rotational speed of the centrifugal pump wherein the amount of negative feedback provided by the valve assembly is proportional to a rotational speed of the centrifugal pump such that a pressure of the valve inlet is proportional to a square of a ratio of actual centrifugal pump speed to a reference centrifugal pump speed.

2. The stability valve assembly of claim 1, further comprising:
a bias member in contact with the valve member and applying force to the valve member along the valve axis in a direction towards a valve seat.

3. The stability valve assembly of claim 1, wherein the valve member includes a plurality of second orifices, each second orifice being distributed about an outer circumference of the stepped portion of the valve member at points that extend radially from a point on the valve axis.

4. The stability valve assembly of claim 1, a non-stepped portion of the valve member having a first diameter, and the stepped portion having a second diameter greater than the first diameter.

5. The stability valve assembly of claim 1, wherein a non-stepped portion of the valve member includes a circumferential section that extends along the valve axis, and includes a cross-sectional portion that is perpendicular to the valve axis, the first orifice being located at a point where the valve axis extends through the cross-sectional portion.

6. The stability valve assembly of claim 1, wherein the first orifice and at least one second orifice facilitate a drop in pressure of a fluid such that a pressure of the valve chamber is less than each of a pressure of the valve inlet and a pressure of the valve outlet.

7. A method of providing feedback in a stability valve assembly, comprising:
applying a centrifugal pump outlet pressure in a first direction along a valve axis to a first side of a non-stepped portion of a valve member, the valve member being movable along the valve axis;
applying a reference pressure from upstream of the centrifugal pump in the first direction to a stepped portion of the valve member;
applying a bias member force to a second side of the valve member in a second direction opposite of the first direction; and
applying a valve body pressure in the second direction to the second side of the non-stepped portion and to a second side of the stepped portion, the valve body pressure being connected to the centrifugal pump outlet pressure through a first valve member orifice, and being connected to a downstream valve pressure through at least one second valve member orifice and, wherein the centrifugal pump outlet pressure is proportional to a square of a ratio of an actual centrifugal pump speed to a reference centrifugal pump speed.

8. The method of claim 7, wherein the valve member includes a plurality of second orifices, each second orifice being distributed about an outer circumference of the stepped portion of the valve member at points that extend radially from a point on the valve axis.

9. The method of claim 7, wherein the non-stepped portion has a first diameter, and the stepped portion has a second diameter greater than the first diameter.

10. The method of claim 7, wherein a non-stepped portion of the valve member includes a circumferential section that extends along the valve axis, and includes a cross-sectional portion that is perpendicular to the valve axis, the first orifice being located at a point where the valve axis extends through the cross-sectional portion.

11. The stability valve assembly of claim 1, further comprising:
a bias member in contact with the plate and applying force to the plate along a valve axis in a direction towards the valve body.

12. The stability valve assembly of claim 1, wherein the first orifice and at least one second orifice facilitate a drop in pressure of a fluid such that a pressure of the valve chamber is less than each of a pressure of the valve inlet and a pressure of the valve outlet.

* * * * *